(12) United States Patent
Gold

(10) Patent No.: US 11,370,943 B1
(45) Date of Patent: Jun. 28, 2022

(54) MACHINABLE ENVELOPING OF ADHESIVE TAPE WITH A BACKING LAYER

(71) Applicant: Peter Gold, Rockville Center, NY (US)

(72) Inventor: Peter Gold, Rockville Center, NY (US)

(73) Assignee: Peter Gold, Rockville Center, NY (US)

( * ) Notice: Subject to any disclaimer, the term of this patent is extended or adjusted under 35 U.S.C. 154(b) by 0 days.

(21) Appl. No.: 17/515,682

(22) Filed: Nov. 1, 2021

(51) Int. Cl.
| | |
|---|---|
| *B65B 63/04* | (2006.01) |
| *C09J 7/30* | (2018.01) |
| *C09J 127/06* | (2006.01) |
| *C09J 167/02* | (2006.01) |
| *B65D 27/14* | (2006.01) |
| *B65D 63/10* | (2006.01) |
| *B65H 35/00* | (2006.01) |

(52) U.S. Cl.
CPC ............... *C09J 7/30* (2018.01); *B65B 63/04* (2013.01); *B65D 27/14* (2013.01); *B65D 63/1009* (2013.01); *C09J 127/06* (2013.01); *C09J 167/025* (2013.01); *B65H 35/00* (2013.01); *C09J 2203/102* (2013.01); *C09J 2427/00* (2013.01); *C09J 2467/00* (2013.01)

(58) Field of Classification Search
CPC .... B65H 35/00; B65H 2301/161; B65B 63/06
See application file for complete search history.

(56) References Cited

U.S. PATENT DOCUMENTS

| | | | | | |
|---|---|---|---|---|---|
| 1,160,818 | A | * | 11/1915 | Barlow | ............................ 383/90 |
| 1,441,266 | A | * | 1/1923 | Clune | ................. A47G 33/0863 |
| | | | | | 428/7 |
| 1,868,601 | A | * | 7/1932 | Harris | ..................... B65D 85/67 |
| | | | | | 28/291 |
| 2,241,673 | A | * | 5/1941 | Mogabgab | .............. B65D 73/00 |
| | | | | | 206/215 |
| 2,331,004 | A | * | 10/1943 | Standish | ................. B65H 54/58 |
| | | | | | 53/118 |
| 2,654,980 | A | * | 10/1953 | Dexter | ..................... B65B 63/06 |
| | | | | | 28/291 |

(Continued)

FOREIGN PATENT DOCUMENTS

| | | | | |
|---|---|---|---|---|
| BR | 202013028958 U2 | * | 10/2015 | ........... B32B 27/304 |
| DE | 102006003756 A1 | * | 7/2007 | ............. C09J 7/0264 |

(Continued)

*Primary Examiner* — Jennifer Bahls
(74) *Attorney, Agent, or Firm* — Schwegman Lundberg & Woessner, P.A.

(57) ABSTRACT

An adhesive tape with a backing layer is longitudinally folded upon itself, creating an approximately 180-degree angle at each of two ends of the tape, and a first longitudinal section of multiple layers of the adhesive tape and a second longitudinal section of multiple layers of the adhesive tape such that the first section is positioned above and parallel to the second section. The folding does not crease the tape at either end of the tape. The first longitudinal section and second longitudinal section are maintained in contact or close proximity via a piece of tape, clip, rubber band, or other means, such that the adhesive tape is maintained in a flat profile. The adhesive tape in its flat profile can then be easily inserted into a United States first class letter-sized mailing envelope.

29 Claims, 8 Drawing Sheets

(56) References Cited

U.S. PATENT DOCUMENTS

| | | | | | |
|---|---|---|---|---|---|
| 2,805,183 | A | * | 9/1957 | Higgins | C09J 7/20 206/412 |
| 3,006,464 | A | * | 10/1961 | Snell | C09J 7/20 206/412 |
| 3,471,098 | A | * | 10/1969 | Jannett | H01G 13/02 242/532.2 |
| 3,858,719 | A | * | 1/1975 | Isaacs | B65H 75/06 206/805 |
| 4,194,340 | A | * | 3/1980 | McIntyre | B65B 13/02 53/529 |
| 4,437,618 | A | * | 3/1984 | Boyle | B65H 75/14 D3/25 |
| 5,269,421 | A | * | 12/1993 | Taylor | B65D 85/672 206/813 |
| 5,676,249 | A | * | 10/1997 | DeProspero | B65D 73/0007 206/495 |
| 5,819,919 | A | * | 10/1998 | O'Neal | B65D 85/677 206/476 |
| 6,212,855 | B1 | * | 4/2001 | Yasunaga | B65B 63/06 53/119 |
| 6,405,403 | B1 | * | 6/2002 | McKay | A47L 13/24 15/228 |
| 8,251,208 | B2 | * | 8/2012 | Morrissey | B65D 5/4208 211/85.15 |
| 9,738,477 | B1 | * | 8/2017 | Kolb | B65D 85/672 |

FOREIGN PATENT DOCUMENTS

| | | | | | |
|---|---|---|---|---|---|
| GB | 2523672 | A | * | 9/2015 | G09F 15/0018 |
| GB | 2547803 | A | * | 8/2017 | A61B 46/00 |

* cited by examiner

MACHINABLE ENVELOPING OF ADHESIVE TAPE WITH A BACKING LAYER

TECHNICAL FIELD

The present disclosure relates to adhesive-backed tapes, and in an embodiment, but not by way of limitation, the preparation and packaging of adhesive-backed tapes with a backing layer for transport and shipment.

BACKGROUND

Adhesive tapes with a peelable backing layer, and in particular reflective adhesive tapes with a backing layer, have many uses. For example, as noted in U.S. Pat. Nos. 8,382,350, 8,596,840, 9,108,569, 9,308,859, and 9,469,246 to Mr. Peter Gold, such tapes can be placed on the inside frame of a vehicle door, such that the tape is visible and reflects the lights of other vehicles when the door is opened. These vehicle door tapes have saved countless lives over the years, and the tapes are not that expensive. However, it often costs more to package and ship the reflective tape than the cost of the tape itself. For example, as illustrated in FIG. 1, the tape 100 can be coiled around a center cardboard core 110. Or, as illustrated in FIG. 2, the tape 200 can be folded into a ribbon pattern and secured in the center by a rubber band 210 or other means. These coiled or ribboned tapes can then be placed into a box or other container and shipped. However, the costs of shipping such containers are more that the cost of the tape itself.

The art is therefore in need of a simpler and more economical manner to package and ship reflective tapes.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

Figure 3A:
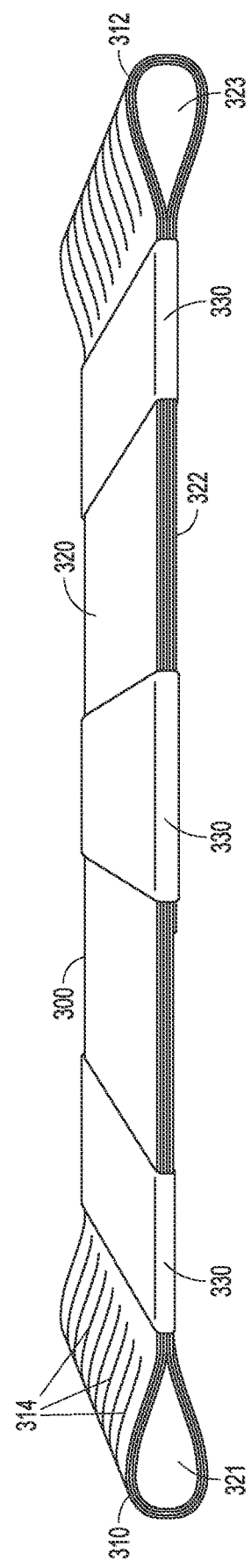
FIG. 3A is a diagram of an embodiment of an adhesive tape with a backing layer folded over upon itself into a flat profile.

FIG. 3A illustrates an embodiment of the present disclosure that addresses the issues with the prior art as discussed above. Specifically, FIG. 3A illustrates an adhesive reflective tape 300. The adhesive tape 300 includes a backing layer (also referred to as a release layer), which allows it to be coiled upon a center core or folded into a ribbon pattern like in the prior art, and also to be folded upon itself like in the embodiment of FIG. 3A. When the tape 300 is to be applied to a surface, the backing layer is removed, and the tape 300 applied to the surface. As further illustrated in FIG. 3A, the adhesive tape 300 is longitudinally folded upon itself. This folding creates a first longitudinal section 320 of multiple layers of the adhesive tape and a second longitudinal section 322 of multiple layers of the adhesive tape. The first longitudinal section 320 is positioned above and parallel to the second longitudinal section 322. The folding further creates a first fold 310 at a first end of the tape and a second fold 312 at a second end of the tape. As can be seen in FIG. 3A, the folds 310, 312 create an angle of approximately 180 degrees between the first longitudinal section 320 and the second longitudinal section 322. The angle can be described as a 180-degree angle because the first longitudinal section 320 is moved through an arc of about 180 degrees until it comes underneath itself and then becomes the second longitudinal section 322 that is then adjacent to the first longitudinal section 320. As further illustrated in FIG. 3A, the first fold 310 at the first end creates a first opening 321 between the first longitudinal section 320 and the second longitudinal section 322, and the second fold 312 creates a second opening 323 at the second end such that the openings 321 and 323 are between the first longitudinal section 320 and the second longitudinal section 322.

As further can be seen from FIG. 3A, this folding of the adhesive tape 300 puts the adhesive tape into a flat profile in which a single layer of the first longitudinal section 320 is in contact with or in proximity to a single layer of the second longitudinal section 322 over the length of the first longitudinal section 320 and the second longitudinal section 322. The flat profile is further positioned between the first opening 321 and the second opening 323. In order to maintain the adhesive tape in the folded flat profile, a means or a device is used to keep the adhesive tape in the flat profile. The means or device can be a wrap 330 positioned traverse to and surrounding the first longitudinal section 320 and the second longitudinal section 322. As illustrated in FIG. 3A, the wrap 330 can be positioned a nominal distance from the first end of the tape, a nominal distance from the second end of the tape, and/or a nominal distance from the center of the first longitudinal section 320 and the second longitudinal section 322. In an embodiment, a nominal distance is a quarter of an inch or a half of an inch. However, other distances could also be considered nominal. The means, device, and/or wrap 330 can consist of one or more of a piece of tape, a clip, a rubber band, an interlocking (Velcro) fastener, and a cord.

In an embodiment, the adhesive tape 300 can be made out of polyvinyl chloride (PVC). Because an adhesive tape made out of PVC can be somewhat rigid, especially at the folds 310, 312, several incisions 314 can be made at either the first end or opening 321 and/or the second end or opening 323. These incisions 314 permit the ends of the tape 300 at the folds 310, 312 to be compressible so that the tape can be placed in a typical U.S. first class mailing envelope and shipped through the U.S. Mail at a very reasonable cost. As can be seen in FIG. 3A, the incisions 314 are substantially parallel with the length of the first longitudinal section 320 and the second longitudinal section 322. In an embodiment, the incisions 314 are about one-half of an inch in length.

Figure 3B:
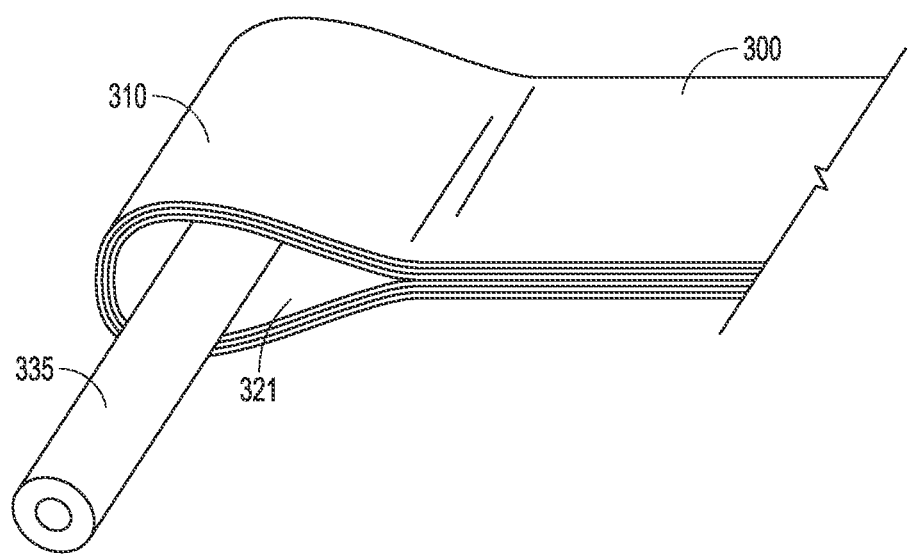
FIG. 3B is a diagram of the embodiment of FIG. 3A and further including a dowel.

In another embodiment, as illustrated in FIG. 3B, the adhesive tape 300 can be made out of polyethylene terephthalate (PET). In this embodiment, a dowel 335 can be placed in the opening 321 and/or the opening 323. The dowel can be a simple piece of cord, a simple rod of wood, or some other material. The dowel serves to prevent creasing of the tape at the folds.

As noted above, the folded tape 300 of FIG. 3A can be placed into an ordinary U.S. First Class letter envelope and then shipped through the U.S. mails. As known to those of skill in the art, such envelopes can be referred to as #10 envelopes, and are approximately 4.3 inches by 9.5 inches. Other size envelopes could also be used, such as #6¾ envelopes, which are about 3.63 inches by 6.5 inches in dimensions. Other sizes are also usable, as long as those other sizes meet United States Post Office regulations to be a machinable first class letter not requiring hand stamping. In general, a machinable first class letter includes an envelope that is not less than 5 inches long, 3½ inches high, and 0.007-inch thick. For pieces that are more than 4¼ inches high or 6 inches long, or both, the minimum thickness is 0.009 Pieces that do not meet the 0.009 thickness are nonmachinable letters. A machinable first class letter can further include an envelope that is not more than 11-½ inches long, or more than 6⅛ inches high, or greater than ¼-inch thick. Further such envelopes should be rectangular, with four square corners and parallel opposite sides. Letter-sized, card-type mail pieces made of cardstock may have finished corners that do not exceed a radius of 0.125 inch (⅛ inch), unless prepared as Customized Market Mail. The envelopes should further have an aspect ratio (length divided by height) of 1.3 to 2.5. Such machinable first class letters are subject to additional dimensional restrictions, depending on the mail piece design. See 39 C.F.R. 1.1 et seq. The ability to ship an adhesive tape 300 in a U.S. first class letter envelope has the advantages outlined in the following paragraph.

Figure 1:
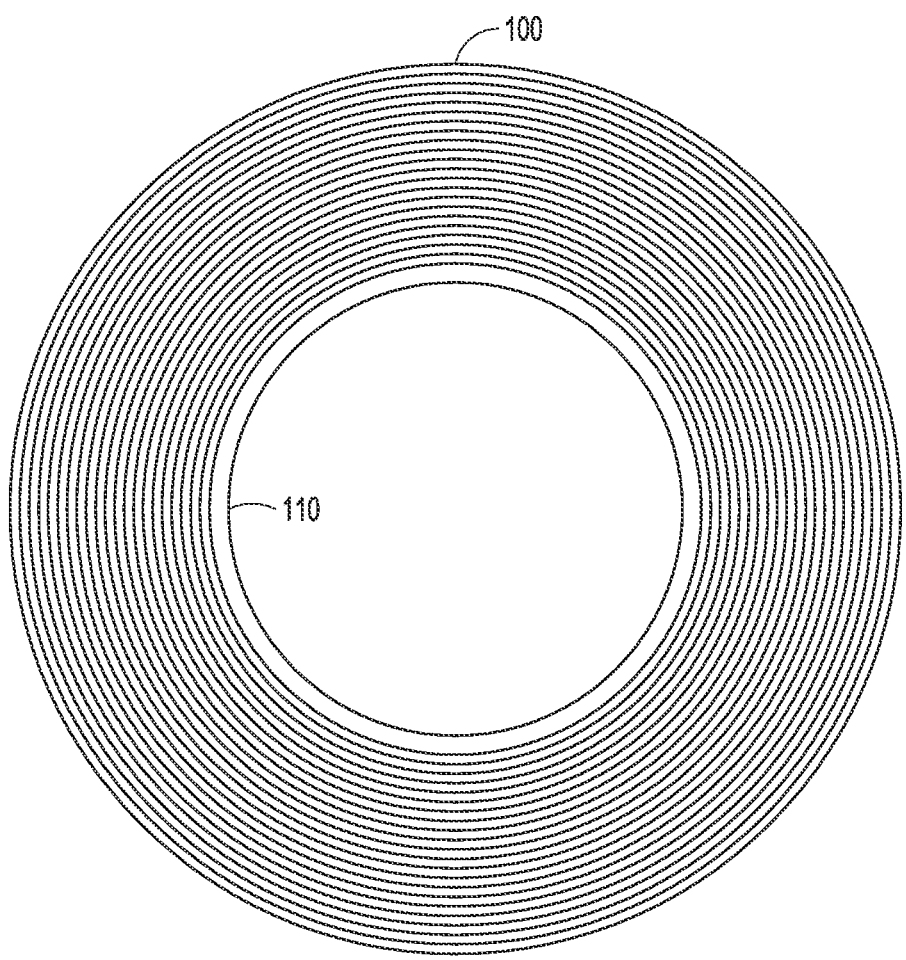
FIG. 1 is a diagram of a reflective tape that is wrapped around a center core.
Figure 2:
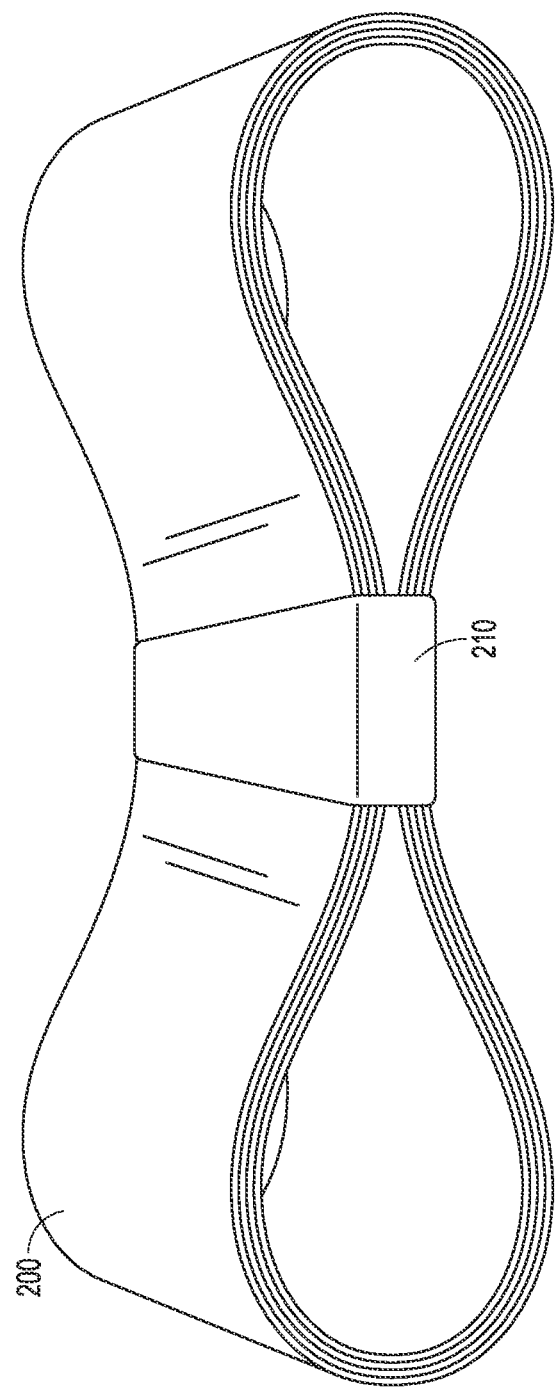
FIG. 2 is a diagram of a reflective tape folded into a ribbon pattern.

First, in the prior art (FIGS. 1 and 2), one of the primary reasons for coiling a continuous length of reflective adhesive tape is to prevent any creasing of the tape. Any creasing of the tape permanently damages the tape. However, while coiling the tape is advantageous in utility and cost in larger lengths in shipping as a parcel (for example, 150 feet of tape for $7.50 in the year 2021), the embodiments disclosed herein makes it possible to provide individual, folded coils, each having a continuous length of 15 feet, "enveloping" each coil flat into a letter-sized United States Post Office envelope. Such an envelope meets all the requirements for processing and handling as a "machinable envelope." The cost to mailing such a machinable envelope in the year 2021 starts at 58 cents. There is therefore much commercial value to the embodiments of this disclosure because the cost of parcel shipping is avoided.

Figure 3C:
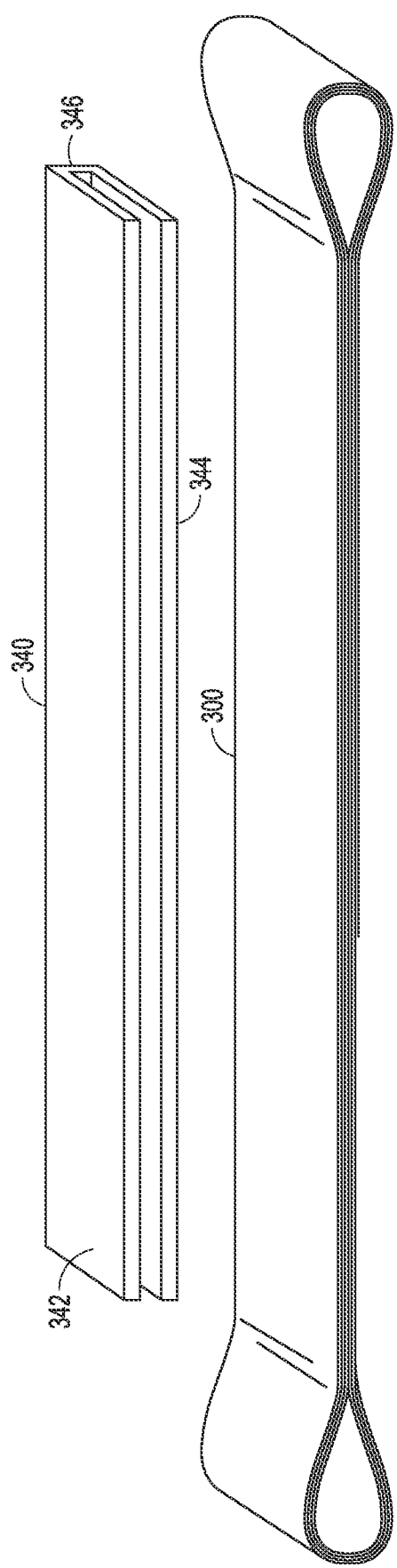
FIG. 3C is a diagram of the embodiment of FIG. 3A and further including an adaptor.

FIG. 3C is a diagram of another embodiment that includes an adapter. The adapter 340 includes a first planar surfaces 342 and a second planar surface 344. The first planar surface 342 is coupled to the second planar surface 344 via a surface 346 that is perpendicular to the first planar surface 342 and the second planar surface 344. The adaptor 340 is positioned around the first longitudinal section 320 and the second longitudinal section 322, such that the first planar surface 342 and the second planar surface 344 are flush with the first fold 310 and the second fold 312.

Figure 4A:
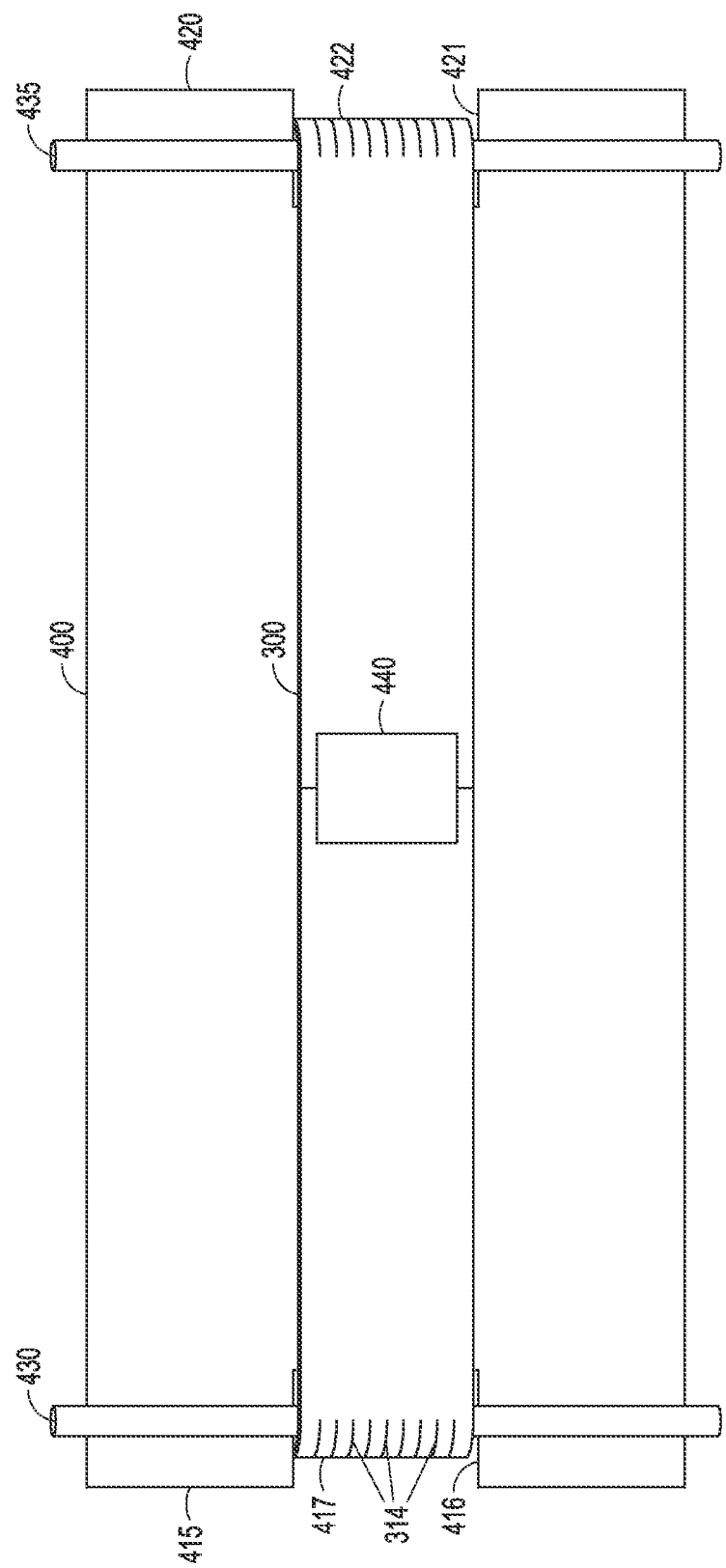
FIG. 4A is a diagram of an embodiment of a support for folding an adhesive tape into a flat structure.
Figure 4B:
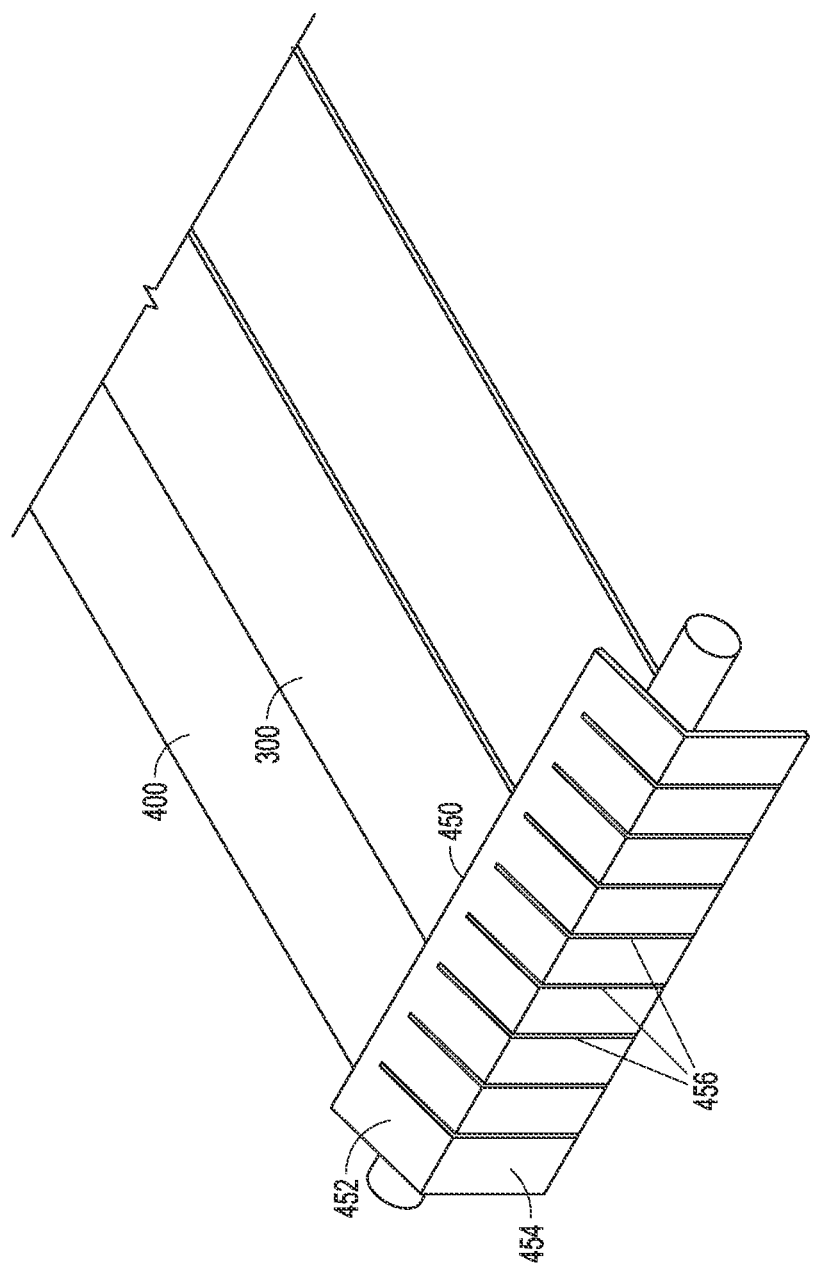
FIG. 4B is a diagram of the embodiment of FIG. 4A and further including a V-shaped end piece.

FIGS. 4A and 4B are diagrams of an embodiment of an apparatus or support for folding and holding an adhesive tape with a backing layer into a flat structure. Referring first to FIG. 4A, a planar, longitudinal support 400 includes a first end 415 and a second end 420. The support 400 further includes a first cut-out section 416 in the first end and a second cut-out section 421 in the second end. As can be seen from FIG. 4A, the adhesive tape 300 is longitudinally wound around the planar, longitudinal support 400 such that the adhesive tape is positioned in the first cut-out section 416 and the second cut-out section 421. This winding creates a first fold 417 in a first end of the adhesive tape comprising a first angle of approximately 180 degrees and a second fold 422 in a second end of the adhesive tape comprising a second angle of approximately 180 degrees. This further creates the first longitudinal section 320 (see FIG. 3A) of multiple layers of the adhesive tape and a second longitudinal section 322 of multiple layers of the adhesive tape. The first section 320 is separated from the second section 322 by the planar, longitudinal support 400.

FIG. 4A further illustrates, in an embodiment, incisions 314 in the first fold 417 and the second fold 422. As can be seen from FIG. 4A, the incisions 314 are oriented along a longitudinal axis of the planar, longitudinal support 400.

In an embodiment, a first lateral dowel support 430 is positioned at the first end of the planar, longitudinal support 400. The first lateral dowel support 430 is positioned adjacent to the first cut-out section 416. The first lateral dowel support 430 is perpendicular to the first longitudinal section 320 and the second longitudinal section 322. A second lateral dowel support 435 is positioned at the second end of the planar longitudinal support. The second lateral dowel support 435 is positioned adjacent to the second cut-out section 421. The second lateral dowel support 435 is perpendicular to the first longitudinal section 320 and the second longitudinal section 322. The first lateral dowel support 430 and the second lateral dowel support 435 prevent a crease from forming in the adhesive tape. In an embodiment, the first lateral dowel support 430 and the second lateral dowel support 435 are integral with the planar, longitudinal support 400. The planar, longitudinal support 400, the first lateral dowel support 430, and the second lateral dowel support 435 can be manufactured out of cardboard, metal, and/or plastic. The first lateral dowel support 430 and the second lateral dowel support 435 can be a cord.

FIG. 4A further illustrates, in an embodiment, a fastener or fastening means 440 that is coupled to an end of the adhesive tape and to a section of the adhesive tape. The fastener 440 holds the tape 300 securely wrapped around the support apparatus 400. The fastener 440 can be one or more of a second piece of tape, a clip, a rubber band, an interlocking fastener (Velcro), and a cord.

As with the embodiments of FIGS. 3A, 3B, and 3C, the embodiment of FIG. 4A can be sized for placement in a United States first class letter-sized mailing envelope. Stated in another fashion, the embodiment is sized for placement into an envelope that is sized to meet United States Post Office regulations to be a machinable first class letter not requiring hand stamping.

FIG. 4B illustrates a variation of the embodiment of FIG. 4A that includes a V-shaped end piece 450. The end piece or cover piece 450 is configured for attachment to the first end 415. The cover piece 450 includes a first section 452 and a second section 454. The first section 452 and the second section 454 form an approximately 90-degree angle, and the first section 452 and the second section 454 include incisions 456 oriented along the longitudinal axis of the planar, longitudinal support 400. The V-shaped end piece 450 provides a tapered, pointed end that further assists in the machine processing of the support 400 when processed by the U.S. Postal Service.

Figure 5:
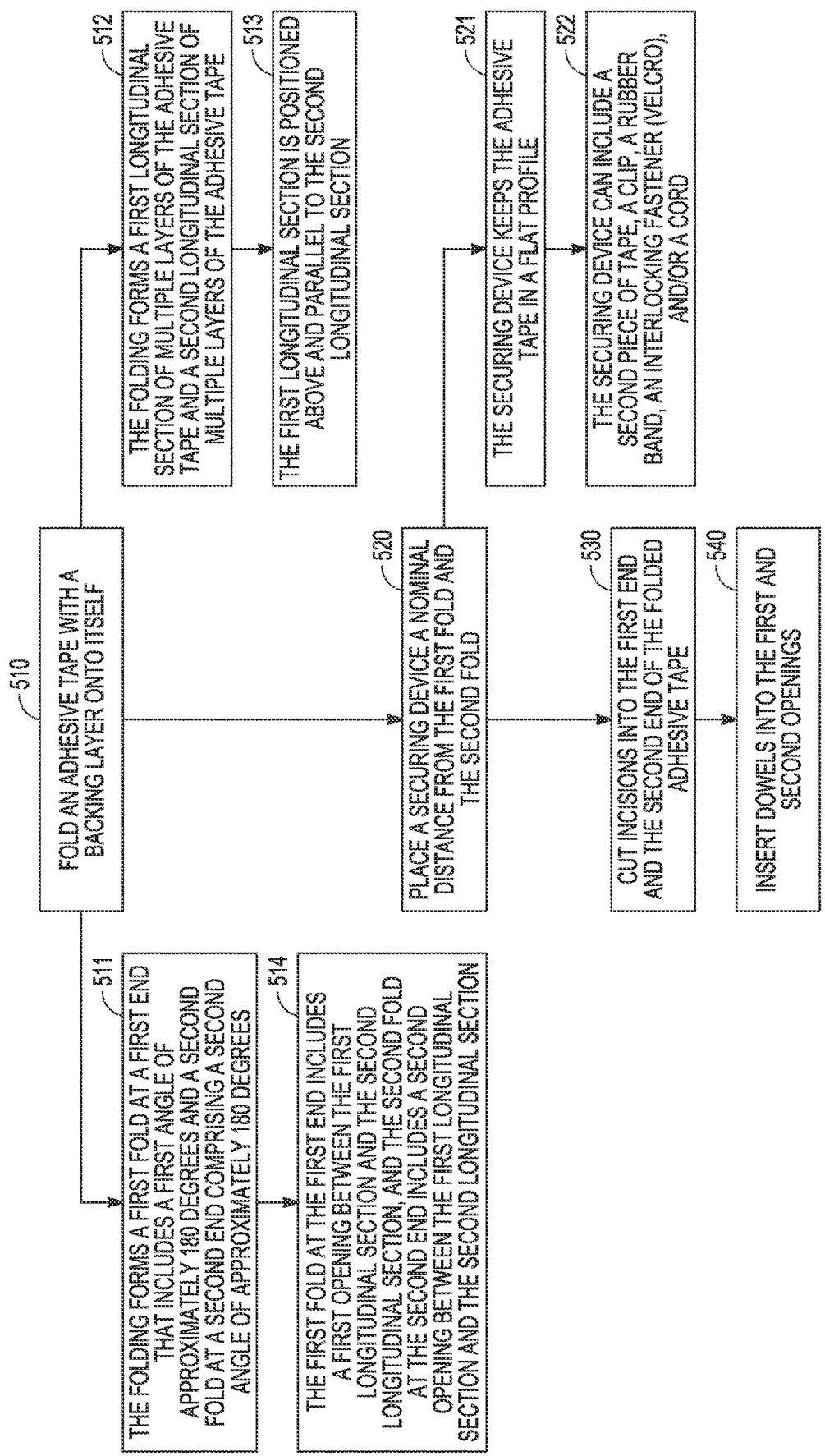
FIG. 5 is a diagram of a process of machinable enveloping of an adhesive tape with a backing layer.

FIG. 5 is a diagram of a process of machinable enveloping of an adhesive tape with a backing layer. FIG. 5 includes a number of blocks 510-540. Though arranged substantially serially in the example of FIG. 5, other examples may reorder the blocks, omit one or more blocks, and/or execute two or more blocks in parallel.

Referring now specifically to FIG. 5, at 510, an adhesive tape with a backing layer is folded onto itself. This folding forms a first fold at a first end that includes a first angle of approximately 180 degrees and a second fold at a second end comprising a second angle of approximately 180 degrees (511). This folding further forms a first longitudinal section of multiple layers of the adhesive tape and a second longitudinal section of multiple layers of the adhesive tape (512). The first longitudinal section is positioned above and parallel to the second longitudinal section (513). The first fold at the first end includes a first opening between the first longitudinal section and the second longitudinal section, and the second fold at the second end includes a second opening between the first longitudinal section and the second longitudinal section (514).

At 520, a securing device is placed at a nominal distance from the first fold and the second fold. The securing device maintains contact or proximity between a single layer of the first longitudinal section and a single layer of the second longitudinal section over a longitudinal length of the first longitudinal section and the second longitudinal section, which keeps the adhesive tape in a flat profile (521). As indicated at 522, the securing device can include a second piece of tape, a clip, a rubber band, an interlocking fastener (Velcro), and/or a cord.

At 530, incisions are cut into the first end and the second end of the folded adhesive tape. The incisions are oriented along a longitudinal length of the adhesive tape. These incisions assist in the compressibility of the folds and the machine processing of the folded tape when placed into a U.S. First Class mailing envelope. The incisions also help to prevent creasing of the tape at the folds.

At 540, a first lateral dowel is inserted into the first opening and a second lateral dowel is inserted into the second opening. The dowels prevent creasing of the tape at the folds.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. An apparatus comprising:
   an adhesive tape comprising a backing layer, wherein the adhesive tape is longitudinally folded upon itself, thereby creating a first fold at a first end comprising a first angle of approximately 180 degrees and a second fold at a second end comprising a second angle of approximately 180 degrees, thereby creating a first longitudinal section of multiple layers of the adhesive tape and a second longitudinal section of multiple layers of the adhesive tape, the first section positioned above and parallel to the second section;
   wherein the first fold at the first end comprises a first opening between the first longitudinal section and the second longitudinal section, and wherein the second fold at the second end comprises a second opening between the first longitudinal section and the second longitudinal section; and
   means for maintaining a single layer of the first longitudinal section in contact with or in proximity to a single layer of the second longitudinal section over a length of the first longitudinal section and the second longitudinal section and between the first opening and the second opening, thereby maintaining the first fold and the second fold and the first opening and the second opening, such that the adhesive tape comprises a flat profile;
   wherein the apparatus is sized for placement into an envelope that meets United States Post Office regulations for a machinable first class letter not requiring hand stamping; and
   further comprising the envelope;
   wherein the adhesive tape comprises polyethylene terephthalate (PET), and comprising a first dowel positioned in the first opening and a second dowel positioned in the second opening.

2. The apparatus of claim 1, wherein the adhesive tape comprises polyvinyl chloride (PVC), and comprising a plurality of incisions at the first end and the second end.

3. The apparatus of claim 2, wherein the plurality of incisions comprises a length of approximately one-half of an inch.

4. The apparatus of claim 2, wherein the plurality of incisions is substantially parallel with the length of the first longitudinal section and the second longitudinal section; and wherein the incisions penetrate through the adhesive tape at the first fold and at the second fold.

5. The apparatus of claim 1, wherein the means comprise a wrap positioned traverse to and surrounding the first longitudinal section and the second longitudinal section.

6. The apparatus of claim 5, wherein the wrap is positioned a nominal distance from the first end or a nominal distance from a center of the length of the first longitudinal section and the second longitudinal section.

7. The apparatus of claim 5, comprising a plurality of wraps, wherein the plurality of wraps is positioned a nominal distance from the first end, the second end, and an approximate center of the length of the first longitudinal section and the second longitudinal section.

8. The apparatus of claim 5, wherein the wrap comprises one or more of a second tape, a clip, a rubber band, an interlocking fastener, or a cord.

9. The apparatus of claim 1, wherein the apparatus is sized for placement into a United States first class letter-sized mailing envelope.

10. The apparatus of claim 1, wherein the adhesive tape is reflective.

11. The apparatus of claim 1, comprising a support comprising a first planar surface and a second planar surface, the first planar surface coupled to the second planar surface via a surface perpendicular to the first planar surface and the second planar surface, wherein the support is positioned around the first longitudinal section and the second longitudinal section, such that the first planar surface and the second planar surface are flush with the first fold and the second fold.

12. An apparatus for winding and holding an adhesive tape with a backing layer comprising:
   a planar, longitudinal support comprising a first end and a second end; and
   a first cut-out section in the first end and a second cut-out section in the second end;
   wherein the adhesive tape is longitudinally wound around the planar, longitudinal support such that the adhesive tape is positioned in the first cut-out section and the second cut-out section, thereby creating a first fold in a first end of the adhesive tape comprising a first angle of approximately 180 degrees and a second fold in a second end of the adhesive tape comprising a second angle of approximately 180 degrees, thereby creating a first longitudinal section of multiple layers of the adhesive tape and a second longitudinal section of multiple layers of the adhesive tape, the first longitudinal section being separated from the second longitudinal section by the planar, longitudinal support, wherein the first longitudinal section is a first single stack of the multiple layers of the adhesive tape and the second longitudinal section is a second single stack of the multiple layers of the adhesive tape;
   a first lateral dowel support positioned at the first end of the planar, longitudinal support, the first lateral dowel support positioned adjacent to the first cut-out section, the first lateral dowel support perpendicular to the first longitudinal section and the second longitudinal section; and
   a second lateral dowel support positioned at the second end of the planar longitudinal support, the second lateral dowel support positioned adjacent to the second cut-out section, the second lateral dowel support perpendicular to the first longitudinal section and the second longitudinal section.

13. The apparatus of claim 12, comprising a plurality of incisions in the first fold and the second fold, the plurality of incisions oriented along a longitudinal axis of the planar, longitudinal support.

14. The apparatus of claim 12, comprising the adhesive tape.

15. The apparatus of claim 12, wherein the first lateral dowel support and the second lateral dowel support prevent a crease from forming in the adhesive tape.

16. The apparatus of claim 12, wherein the first lateral dowel support and the second lateral dowel support are integral with the planar, longitudinal support.

17. The apparatus of claim 12, wherein the first lateral dowel support and the second lateral dowel support comprise a cord.

18. The apparatus of claim 12, wherein one or more of the planar, longitudinal support, the first lateral dowel support, and the second lateral dowel support comprise one or more of a cardboard, a metal, or a plastic.

19. The apparatus of claim 12, comprising a fastener coupling an end of the adhesive tape to a section of the adhesive tape.

20. The apparatus of claim 19, wherein the fastener comprises one or more of a second tape, a clip, a rubber band, an interlocking fastener, or a cord.

21. The apparatus of claim 12, wherein the apparatus is sized for placing in a United States first class letter-sized mailing envelope.

22. The apparatus of claim 21, wherein the apparatus is positioned in the United States first class letter-sized mailing envelope.

23. The apparatus of claim 22, comprising the United States first class letter-sized mailing envelope.

24. The apparatus of claim 12, wherein the apparatus is sized for placement into an envelope that is sized to meet United States Post Office regulations to be a machinable first class letter not requiring hand stamping.

25. The apparatus of claim 12, comprising:
   a cover piece for attachment to the first end, the cover piece comprising a first section and a second section, the first section and the second section forming an approximately 180-degree angle, and the first section and the second section comprising a plurality of incisions oriented along the longitudinal axis of the planar, longitudinal support.

26. A method comprising:
   folding an adhesive tape with a backing layer onto itself, thereby forming a first fold at a first end comprising a first angle of approximately 180 degrees and a second fold at a second end comprising a second angle of approximately 180 degrees, thereby forming a first longitudinal section of multiple layers of the adhesive tape and a second longitudinal section of multiple layers of the adhesive tape, the first longitudinal section positioned above and parallel to the second longitudinal section, wherein the first fold at the first end comprises a first opening between the first longitudinal section and the second longitudinal section, and wherein the second fold at the second end comprises a second opening between the first longitudinal section and the second longitudinal section;
   wherein the first fold at the first end comprises a first opening between the first longitudinal section and the second longitudinal section, and wherein the second fold at the second end comprises a second opening between the first longitudinal section and the second longitudinal section;
   positioning a first dowel in the first opening and a second dowel in the second opening;
   placing a securing device a nominal distance from the first fold and the second fold, thereby maintaining contact or proximity between a single layer of the first longitudinal section and a single layer of the second longitudinal section over a longitudinal length of the first longitudinal section and the second longitudinal section, such that the adhesive tape comprises a flat profile; and
   placing the adhesive tape into an envelope that is sized to meet United States Post Office regulations for a machinable first class letter not requiring hand stamping.

27. The method of claim 26, wherein the securing device comprises one or more of a second tape, a clip, a rubber band, an interlocking fastener, or a cord.

28. The method of claim 26, comprising cutting a plurality of incisions into the first end and the second end, wherein the plurality of incisions is oriented along a longitudinal length of the adhesive tape.

29. The method of claim 26, comprising inserting a first lateral dowel into the first opening and inserting a second lateral dowel into the second opening.

* * * * *